(No Model.)
G. W. GRADER.
METHOD OF BALING AND PACKING AWAY COTTON.
No. 281,490. Patented July 17, 1883.
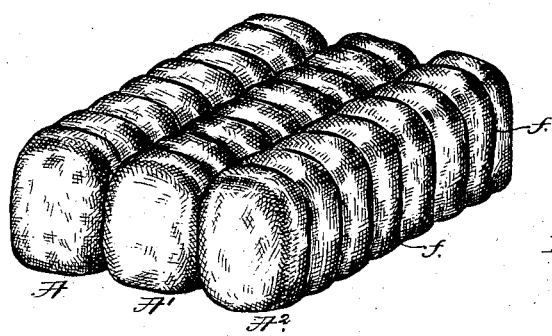
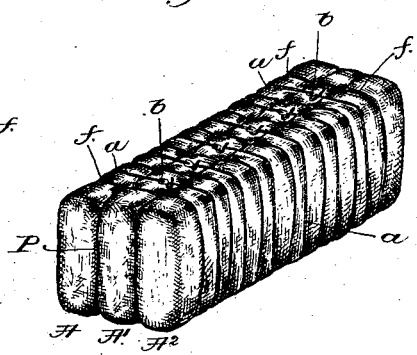
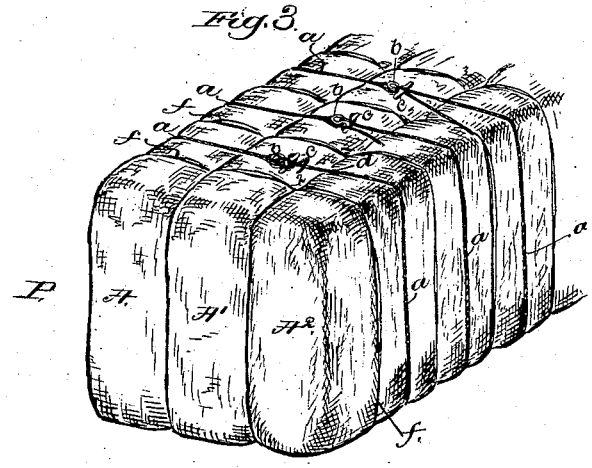
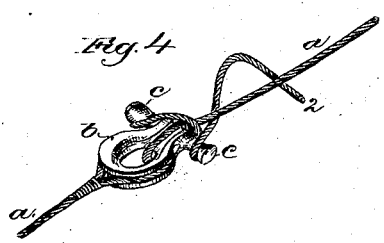
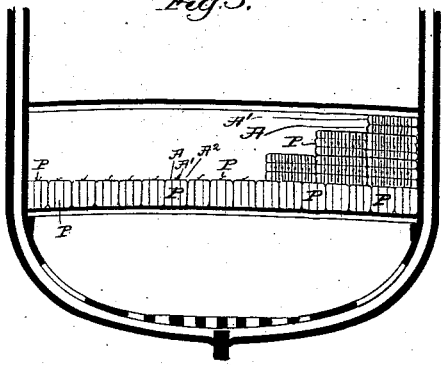
Witnesses.
John F. C. Prinkert
Fred A. Powell.
Inventor.
George W. Grader.
by Crosby & Gregory
attys.

UNITED STATES PATENT OFFICE.

GEORGE W. GRADER, OF MARBLEHEAD, MASSACHUSETTS.

METHOD OF BALING AND PACKING AWAY COTTON.

SPECIFICATION forming part of Letters Patent No. 281,490, dated July 17, 1883.

Application filed May 15, 1883. (No model.)

*To all whom it may concern:*

Be it known that I, GEORGE W. GRADER, of Marblehead, county of Essex, State of Massachusetts, have invented an Improvement in Method of Baling and Stowing Away Cotton, of which the following description, in connection with the accompanying drawings, is a specification, like letters on the drawings representing like parts.

It is well known that cotton is very bulky, and to enable it to be handled and transported profitably the same is compressed into bales, and the said bales have applied to them metal ties. In the present system of tying or binding bales of cotton the metal ties cover but a narrow portion of the compressed surface of the bale, and are applied thereto while the bale is in the press, the bale, if of usual weight, then being about six inches in thickness; but the bale, after its removal from between the platens of the press, notwithstanding the metal ties which are fastened about it, expands after a short time to at least twenty-two inches at its greatest thickness between ties. This is the condition in which the bales are placed on vessels to be stevedored for shipment. Cotton being very bulky, and space in vessels being very expensive, it becomes a matter of the greatest importance to have the former brought into its smallest possible compass and be retained in such condition to fully utilize the available but limited space of the latter. As has been stated, bales of cotton of average weight can be reduced to six inches in thickness while between the press-platens; but this compact condition of the bale cannot be utilized or made serviceable for stowage or shipment on vessels, for the bale, soon after its removal from between the press-platen, swells and becomes from three to four times larger, as above stated, than when it was in its most compressed condition, and hence it will be seen that the expanded bale will be composed of less than one-third cotton and more than two-thirds air, thus actually making available for carrying purposes less than one-third of the carrying capacity of the vessel. Appreciating this fact, I have experimented to so prepare the bales to be stowed or stevedored and shipped that they shall be chiefly cotton, and not, as now, chiefly air. As now commonly practiced when stowing away baled cotton on shipboard, the bales are placed side by side in rows, either across the vessel or up and down between decks, or in other suitable way, and the stevedore, with jack-screws and other usual devices, operating slowly, somewhat reduces the thickness of the previously once compressed but subsequently expanded bales, and in various well-known ways retains as much as possible of the compression thus effected, while the screws or other usual appliances are removed preparatory to introducing other bales into the space just before occupied by the said screws or appliances. This system of stowing cotton in vessels, or "stevedoring cotton," as it is called, is very slow and expensive, requiring very considerable delay at port, and, further, the bales not occupying their most compressed condition, and not being chiefly of cotton, as before stated, makes it impossible to utilize more than one-third of the full carrying capacity of the vessel, thus greatly increasing the cost of transporting cotton. A vessel loaded with cotton containing this large percentage of air requires very considerable ballast, which takes up much of her stowage-space which would otherwise be available for cotton.

In the drawings, Figure 1 represents, as set side by side, three bales of cotton such as now usually prepared for shipment, they having on them the usual metal ties. Fig. 2 represents the same three bales packaged in accordance with my system, the package being bound together by removable ties, preferably six in number, but without removing the usual metal ties. Fig. 3, on a larger scale, shows a portion of a package of bales with my removable ties thereon in different stages. Fig. 4 shows the tie by itself, and Fig. 5 shows in vertical section a sufficient portion of a vessel to illustrate one manner of placing the packages therein so that they may be stevedored by their own expansion.

In accordance with my invention, I preferably take three ordinary compressed bales, A A' A², such as shown in Fig. 1, they containing the usual metal ties, $f$, seven in number, place them in a powerful press between the platens thereof, and recompress them into one bale, as seen in Fig. 2, reducing them to a thickness of about nineteen inches, and, if two bales are taken, to about thirteen inches; or, in other words, I again apply to the previously-compressed bales a pressure substantially the same as when each bale was before compressed, as has been stated, and compose of several of them a package, P. In this second compression or recompression of the bales the contiguous sides thereof act each for the other as a continuous platen, and when the package P of two or more bales so compressed and tied with removable ties $a$, as will be hereinafter described, is removed from between the press-platens, the said contiguous sides of the bales forming the package remain in the same condition that they were in when between the press-platens, and the subsequent re-expansion to some extent of the said package, due to the influx of air, is only into and through the exposed surfaces of the said package, which latter, if composed of three bales, would enable the two faces of the inner or central bale and the inner faces of the two outer bales in contact therewith to be hermetically sealed from the action of the atmosphere, so that air cannot get into the bales where they are in contact, and not into the center bale, except for a short distance at its end. The pressure put upon the package in order to get the best results should exceed, per square inch, usual atmospheric pressure, and the excess of pressure above atmospheric pressure may be more or less in degree—the greater the excess the more beneficial the results. The package P, while in its condition of greatest compression between the press-platens, and with the usual metal dies yet on, is tied by a series of removable ties, $a$, preferably of rope, and in practice preferably six in number. One of these ties is shown separately in Fig. 4, and at one end the rope is provided with or attached to a metal thimble, $b$, provided with a belaying-cleat, $c$. To apply the tie, the free end of the rope is passed through the said thimble, and then is wrapped with suitable turns about the cleat $c$, as shown in the drawings, and a bight of the rope near its free end 2 is passed under the standing part of the tie, as shown at $d$, Fig. 3, leaving the said free end ready to be pulled when it is desired to remove the ties from the package, which will preferably be done with all the ties after the packages have been properly and closely placed in stowage position on shipboard; but the ties may be removed just before the package of two or more bales is stowed in the vessel, the removal of the ties $a$ after stowage on vessel, or just before, enabling the said ties to be reused at the press. I do not herein claim this tie, as it will form the subject-matter of another application.

In Fig. 4 I have represented a cross-section of a vessel, and therein I have represented one full horizontal row of packages, P, of three bales each, and at $a$ I have represented the removable ties, their free ends and the rings being at the upper side of the said packages, in order that they may be readily pulled and untied and the said ties be removed. Above this row of packages, lying on the deck of the vessel, I have shown one partially-completed horizontal row of packages, P, with the edges of the bales turned to view, and in the said figure, at the right, I have shown one tier of packages carried up to the deck above. In the said drawings I have shown the vessel as filled by means of a row or tier of packages from side to side and deck to deck; but in practice the vessel will have numerous posts or stanchions between decks, about and among which the packages will be stowed or stevedored; but in the drawings I have omitted all the usual divisions found in cotton-transporting vessels to divide their stowage-space between decks, and it will be understood that the packages will be stowed in usual places and spaces, it being only essential in my plan, to insure that the packages stevedore themselves, that care be taken to so place the said packages that when the ties $a$ are removed, as stated, the expansion of the separate bales will be in the right direction to stevedore themselves.

The press which I now prefer to use in connection with this system will be substantially that patented by and built for me, it being the only press now in use having the proper opening and power to accomplish the recompression required.

In practice I am enabled to retain the two recompressed bales referred to, when removed from between the press-platens, in the space of about twenty inches in thickness, when as single bales before recompression each in thickness occupied a space of about twenty inches, and in the case of the three-bale packages a space of about twenty-eight inches in thickness. When compressed by screws in the vessel, three usual bales would require a space of about sixty inches for their thickness. The bales referred to are of average weight, or about four hundred and fifty to five hundred pounds. To fill out a tier of packages should the space be too small for a three-bale package, I shall use a two-bale package, and if too small for a two-bale package I will remove the outside ties and put into the said space one of the bales taken from it. When the removable ties $a$, added to the packages after the recompression of the bales, as described in the press, are removed from the said packages, they having been placed in tiers in the vessel, the natural expansion of the exposed parts of the said packages will be sufficient to enable them to properly stevedore or closely pack themselves.

From the foregoing it will be observed that I have devised a method or system of preparing bales of cotton for stowage, and of stowing the same on shipboard, and by my system it is possible to substantially double the present cotton-carrying capacity of vessels, as well as to double the present stowage capacity of store-houses, and at the same time I am enabled to reduce the time necessary for loading a vessel to about one-fifth of that required by the present system, and entirely dispense with the screw system alluded to as now practiced, thus reducing in like proportion the cost of stevedoring or stowing cotton on shipboard.

In Fig. 3 the removable tie farthest from the front end of the bale shows the rope as simply drawn through the thimble, and the second removable tie the rope is wound about the belaying-cleat, and the third tie the rope near its end has a bight of the same tucked under the main part of the rope.

I claim—

That improvement in the art or method of stowing away cotton which consists in recompressing into a package two or more once-compressed bales, securing the said packages with removable ties to hold the same in compressed condition, stowing the same away in its recompressed state, and removing said removable ties, whereby the natural expansion of the package is made available for stevedoring or closely confining and holding the said cotton in proper stowage condition, substantially as described.

In testimony whereof I have signed my name to this specification in the presence of two subscribing witnesses.

GEORGE W. GRADER.

Witnesses:
G. W. GREGORY,
B. J. NOYES.